United States Patent [19]

La Joie et al.

[11] Patent Number: 5,630,048

[45] Date of Patent: May 13, 1997

[54] DIAGNOSTIC SYSTEM FOR RUN-TIME MONITORING OF COMPUTER OPERATIONS

[76] Inventors: Leslie T. La Joie, 4203 Dauphine Dr., Austin, Tex. 78727; Eugene M. Miller, 13112 Marble Falls Cove, Austin, Tex. 78729; Carl S. Dobbs; Michael B. Solka, both of 1101 S. Capital of Texas Hwy., Bldg. J. Suite 220, Austin, Tex. 78746

[21] Appl. No.: 246,058

[22] Filed: May 19, 1994

[51] Int. Cl.$^6$ ........................................ G06F 11/34
[52] U.S. Cl. ................... 395/183.01; 395/183.16
[58] Field of Search .................. 395/575, 182.08, 395/182.09, 182.1, 183.01, 183.13, 183.14, 183.15, 183.16, 183.19, 184.01, 180; 364/239, 239.1, 939.4; 371/67.1, 68.3, 26, 25.1, 22.4

[56] References Cited

U.S. PATENT DOCUMENTS

| | | | |
|---|---|---|---|
| 4,503,536 | 3/1985 | Panzer | 371/26 |
| 4,527,272 | 7/1985 | Reiney | 371/26 |
| 4,672,572 | 6/1987 | Alsberg | 364/900 |
| 4,841,434 | 6/1989 | Mathewes et al. | 364/200 |
| 4,949,252 | 8/1990 | Hauge | 364/200 |
| 5,153,881 | 10/1992 | Bruckert et al. | 371/11.3 |
| 5,201,040 | 4/1993 | Wada et al. | 395/400 |
| 5,293,424 | 3/1994 | Holtey et al. | 380/23 |
| 5,379,386 | 1/1995 | Swarts et al. | 364/239 |
| 5,398,331 | 3/1995 | Huang et al. | 395/575 |
| 5,408,645 | 4/1995 | Ikeda et al. | 395/183.13 |
| 5,408,664 | 4/1995 | Zarrin et al. | 395/700 |

*Primary Examiner*—Robert W. Beausoliel, Jr.
*Assistant Examiner*—Trinh L. Tu
*Attorney, Agent, or Firm*—Skjerven, Morrill, MacPherson, Franklin, and Friel; Ken J. Koestner

[57] ABSTRACT

A monitoring system is coupled to an external computer system by an interface between a data bus internal to the monitoring system and a target bus within the external computer system. Data captured by the monitoring system from the external computer system is provided in parallel to a triggering circuit and to a buffer for temporary storage, The triggering circuit identifies the occurrence of a transaction on the bus of the external computer system and generates a signal to mark a captured data block within the buffer as being characteristic of the triggering transaction. The captured data block is compared with predetermined sets of known transaction data to determine if the captured data block is consistent with the normal operation of the external computer system. A second monitoring facility is provided to perform boundary scan testing on the external computer system.

10 Claims, 8 Drawing Sheets

DIAGNOSTIC SYSTEM FOR RUN-TIME MONITORING OF COMPUTER OPERATIONS

FIELD OF THE INVENTION

The present invention relates to the monitoring of computer systems and, more particularly, to the identification and diagnosis of computer errors that occur during the operation of a computer system.

BACKGROUND OF THE INVENTION

Conventional computer systems run at sufficiently high speeds and are sufficiently complex that, when system errors or system failures occur, it is very difficult to determine the nature of the error or failure. Minor errors in a computer system are corrected or ignored by the computer system without being particularly noticeable to the outside world. It is only when many system errors occur that a system user becomes aware of the system's deterioration. Often, the first time a system user becomes aware of the deterioration of a computer system is when so many small errors have occurred that the computer system suffers a loss of data or a fatal system error.

In many cases, the analysis and diagnosis of computer system errors or breakdowns is sufficiently time consuming and expensive that it is more economical to simply throw away a part or even an entire computer system than to attempt to identify failed components and replace them. Of course, disposing of systems that could readily be repaired if diagnosed represents a considerable waste of resources. Accordingly, it would be desirable to develop a low cost system capable of identifying problems within computer systems so that failing may occur during operation so that analysis would not have to be attempted on an already failed computer system. Failed computer systems may not be readily susceptible to post-failure analysis because of the overall complexity of the computer system and because the computer system must be nearly operational to function to any extent.

A serious difficulty with the failure of conventional computer systems is the expense of such failures. Even very small computer systems can perform mission critical tasks such as functioning as network servers or storing critical data. The failure of a computer system performing such a critical function can be very expensive. To address these problems, various redundancy schemes have been implemented, including redundant hard disk assemblies and entire redundant or mirrored processing systems. Such mirrored processing systems are typified by that described in U.S. Pat. No. 5,153,881 to Bruckert, et al., entitled "Method of Handling Errors in Software." In addition, a variety of fault tolerant strategies have been implemented in the operating system software used to control computer systems. For example, conventional network servers have been developed using both hardware redundancy and software based fault tolerance. Each of these strategies has drawbacks. The addition of redundant hardware increases the expense of a computer system and can greatly reduce the flexibility of the system. Software solutions, including various fault tolerant designs, have had limited success and also reduce the flexibility of the overall computer system. More importantly, software is increasingly a primary source of computer errors. Accordingly, it is undesirable to place excess reliance on software for ensuring the integrity and future operability of a mission critical computer system.

SUMMARY OF THE PREFERRED EMBODIMENTS OF THE INVENTION

In accordance with one aspect of the present invention, a monitoring system comprises a processing unit coupled to a data bus. A non-volatile memory coupled to the processing unit contains a plurality of predetermined data signatures characteristic of an external computer system. The monitoring system includes an external bus interface to an external computer system, where the interface is coupled to a bus within the external computer system to provide signals from the external computer system to the data bus. The processor includes comparison means for comparing the signals from the external computer system to at least one of the plurality of predetermined data signatures characteristic of the external computer system.

In accordance with a further aspect of the monitoring system, the processing unit includes means for decoding a data set from the bus of the external computer system and for generating a transaction identification signal characteristic of a transaction within the external computer system associated with the data set. The monitoring system may further include a lookup table stored in the non-volatile memory, wherein the lookup table stores addresses of the plurality of predetermined data signatures within the non-volatile memory. This aspect of the monitoring system may also include a means for recalling an address from a position in the lookup table in accordance with the transaction identification signal.

In accordance with another aspect of the present invention, a monitoring system comprises a processing unit coupled to a data bus and an interface coupled between the data bus and to a bus within an external computer system so that signals from the external computer system are provided to the data bus. The monitoring system further includes a writable memory for storing a plurality of at least portions of the signals from the external computer system. Coupled to the data bus is a first data path along which signals pass from the external computer system is to the writable memory. A second data path is coupled to the data bus has a trigger circuit disposed along it. The trigger circuit compares a predetermined mask pattern to signals received from the data bus and generates a trigger signal indicative of the result of a comparison between the predetermined mask pattern and a one of the received signals. In this way, the trigger identifies a transaction on the bus of the external computer system.

In accordance with a further aspect of this embodiment, the monitoring system includes a second memory coupled to the writable memory through a control bus and a memory controller coupled to the writable memory and to the second memory. The memory controller causes the writable memory to transfer a data block to the second memory upon receipt by the memory controller of the trigger signal generated by the trigger circuit. A different aspect of this embodiment utilizes the trigger circuit to define a data block within the writable memory, where the data block includes data characteristic of a transaction on the bus of the external computer system. The data block includes data which passed along the second data path prior to the one received signal which caused the trigger circuit to generate the trigger signal and data which passed along the second data path subsequent to the one received signal.

DETAILED DESCRIPTION OF THE PREFERRED EMBODIMENTS

Figure 1:
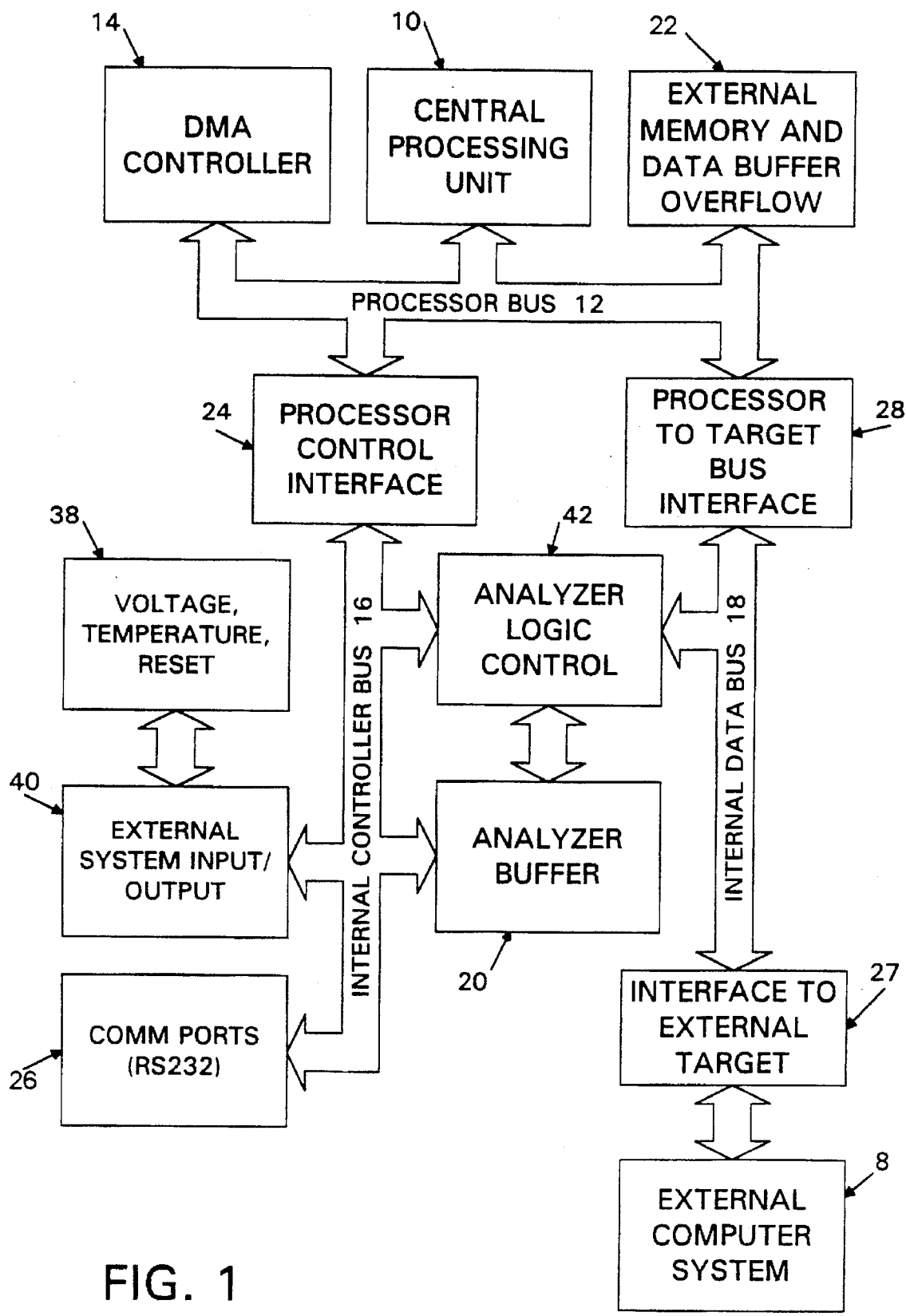
FIG. 1 is a schematic illustration of an embodiment of a monitoring system incorporating a signature analysis capability.

A testing system in accordance with preferred embodiments of the present invention may incorporate one or more system diagnostic strategies. Particularly preferred strategies are described herein. These strategies may be used in various combinations and in combination with conventional system diagnostic strategies. Particularly preferred embodiments of the present invention implement computer system diagnostic strategies in hardware, as possible, to take advantage of the greater speed and reliability associated with hardware implementations of these strategies. Preferred embodiments of the present invention incorporate a microprocessor or one or more state machines within the monitoring system so that the presence of the monitoring system does not slow or otherwise hinder the operation of the processor and other components of the external computer system being monitored.

Overview of Signature Analysis Based Testing

In accordance with one aspect of the present invention, a monitoring system includes a logic analyzer coupled to the processor of an external computer system in such a manner as to instantaneously sample the signals that are input to and output by the processor. This signal set forms a signature of the external computer system which can be associated with certain events or transactions in the external computer system. The signature of the external computer system can then be compared to known good signatures to determine when the external computer system generates a signature that is inconsistent with normal operation. This inconsistency is identified by the monitoring system and the monitoring system can take one or more actions in response to the identification of the inconsistency.

In accordance with another aspect of the present invention, the monitoring system sorts and stores the most relevant signals that are input to or output by the processor of the external computer system. When an error or data inconsistency is detected, the data stored for a period of time prior to the error and subsequent to the error is transferred to an external memory so that the state of the external computer system can be saved for further analysis at a later time. This data set can be decoded and decompiled to provide information that can be used by a system analyst to determine the source of the error or inconsistency.

Overview of Boundary Scan Testing

In accordance with another aspect of the present invention, the monitoring system may be implemented so as to take advantage of the fact that many of the components that make up modern computer systems include internal testing facilities. For example, memories, controllers, I/O components and the processor of the external computer system may include a self test architecture in accordance with guidelines set forth in IEEE Std 1149.1-1990 and IEEE Std 1149.1a-1993, IEEE Standard Test Access Port and Boundary-Scan Architecture, hereby incorporated by reference, which standards are discussed in greater detail below. Such internal testing facilities are generally referred to as "boundary scan tests." Internal testing facilities are typically utilized in chip test, chip burn in, and during board assembly to ensure that components and assemblies that become part of a computer system are initially operational. Preferred embodiments of the present invention incorporate a programmable test controller that can be used to initiate internal tests in the components of the external computer system. Testing of the external computer system can be implemented in response to signature analysis or testing can be performed as a regular maintenance procedure during intervals in which the computer is not heavily used.

Each of these testing strategies is described in greater detail below.

Description of the External Computer System

A monitoring system in accordance with the present invention can be used to monitor, detect and diagnose errors in a variety of different computer systems. Different aspects of the monitoring system can be implemented to greater or lesser extents depending upon the particular external computer system associated with the monitoring system. For example, the logic analyzer aspects of the present invention can be used to their greatest extent when the monitoring system has direct access to the processor of the external computer system. In many cases, such direct processor access requires that the monitoring system be interfaced directly to the processor bus of the external computer system.

When a monitoring system according to the present invention is interfaced to an external computer system incorporating a bus architecture that allows input/output (I/O) devices direct access to the processor, then the logic analyzer aspects of the present invention can be fully utilized even if the monitoring system is not interfaced directly to the processor bus. Such an indirect connection would be typical if the monitoring system is an I/O device to the external computer system, such as when the monitoring system is implemented as a board level product apart from the motherboard of the computer system. In certain conventional bus architectures, direct processor access would not be possible if the monitoring system were not interfaced to the processor board. Bus architectures such as Peripheral Component Interconnect (PCI) do not allow I/O devices direct access to the processor, rather all communication between the processor and I/O devices is through an I/O processor. The I/O processor in a PCI system is an interface which performs arbitration and synchronization functions. In such a system, if the monitoring system is not interfaced directly to the processor bus, then the monitoring system will not directly monitor processor transactions. Rather, the monitoring system will perform signature analysis on transactions between the I/O processor and the various I/O devices.

This somewhat more limited implementation of the monitoring system nevertheless yields valuable information regarding errors or inconsistencies in the external computer system, and signature analysis remains a valid monitoring and diagnostic tool in such an implementation. Signature analysis on I/O transactions is a somewhat less desirable strategy than directly monitoring all of the signals input to and output from the processor. The primary limitation of such an indirect monitoring system is that the presence of an interface can mask problems or the errors or inconsistencies might be introduced through the interface itself. Other aspects of the monitoring system, including signature analysis on the rest of the external computer system as well the boundary scan aspects of the present invention, are readily implemented on buses that cannot directly access the processor.

Similarly, the boundary scan aspects of the present system may not be capable of complete implementation in some computer systems. For example, some bus architectures simply do not incorporate boundary scan capabilities. To implement boundary scan in a system, certain bus lines are preferably dedicated to the signals necessary to implement boundary scan analysis. Necessarily, the presence of such dedicated lines represents a commitment of system resources and a concomitant additional development and production expense. Thus, some computer systems may not be immediately compatible with the boundary scan testing, even if several of the components within the system incorporate internal boundary scan testing facility. Systems that are not compatible with board level or full system boundary scan analysis generally utilize boundary scan testing only for component evaluation or tests during board assembly, so that the pins on system components associated with boundary scan may only be accessible through specialized test equipment. In such systems, additional hardware is sometimes necessary to implement the boundary scan aspects of the present invention. In other systems, it may be impractical to implement some or all of the boundary scan aspects of the present invention. Accordingly, the extent of implementation of a monitoring system in accordance with the present invention may vary depending on the particular target environment.

A monitoring system according to the present invention typically interfaces to a bus of the external computer system. The particular type of bus, the size of the bus, as well as the architecture of the bus will vary from system to system. Common components of the buses that may be monitored include address lines, data lines and control lines. Preferably, an external computer system bus includes one or more lines accessible for boundary scan testing, as well as lines dedicated to error reporting which carry, among other error signals, error codes generated by failed memory accesses. The bus often includes lines that report on cache consistency used to signify that changes have been made to the cache in a way that might render the cache data corrupt or incorrect. The preferred embodiments discussed herein reference an asynchronous bus, which is a bus that does not include a master clock signal. Asynchronous buses utilize strobe signals to coordinate timing between transactions involving different components on the bus. It is of course possible to implement the present system utilizing a synchronous bus; such an implementation could be accomplished directly or with a simplified version of the monitoring system.

Monitoring System Hardware For Signature Analysis

An embodiment of a monitoring system that can be used for performing signature analysis on transactions occurring in an external computer system is described herein with reference to FIG. 1. The monitoring system as described herein may be implemented as a board level product, as a single chip, application specific integrated circuit (ASIC) or with varying levels of the monitoring system integrated on a single chip with other portions of the system as separate components. The degree of integration of the monitoring system will primarily be determined by speed, cost considerations, and by the level of testing that is regularly performed by the monitoring system. Preferred embodiments of the present invention include one or more large memory arrays, which may be implemented outside of an ASIC implementation of the present system because of the relative low cost and high performance of commercially available memory products. Similarly, because of the sophisticated nature of modern microprocessors, it is generally preferable to utilize a commercially available microprocessor, which may be implemented external to an ASIC implementation of the present system. Alternatively, if the microprocessor is available as an ASIC core or logic block, then the commercially available microprocessor can be implemented as part of an ASIC device. It is generally desirable to implement as much of the monitoring system as possible on a single ASIC device because of the relatively low costs of such a system as compared to the expense of assembling complicated board level products.

In preferred embodiments of the present invention, a central processing unit 10 is utilized to control the functions of the monitoring system, to perform a predetermined set of testing procedures, to control the user and machine interfaces, and to perform communications with both the external computer system and other aspects of the outside environment. Provision of a complete microprocessor within the monitoring system greatly enhances the number of functions that are readily performed by the monitoring system. In a particularly preferred embodiment, the monitoring system utilizes an Intel 80960 processor, which is a 32-bit RISC processor available from Intel Corporation of Santa Clara, Calif. The general operation of this processor is described in the *i960 CA/CF Microprocessor User's Manual*, published by Intel Corporation, Order No: 270710-003 (March 1994), which is hereby incorporated by reference. RISC architectures are particularly preferred for the present invention because many of the functions of the monitoring system incorporate large data transfers and multiple simple comparisons on data collected from or about the external computer system. Such types of functions are desirably implemented in RISC architectures, because of the high speed at which such operations are performed in RISC systems. Software products and development libraries are available from a number of vendors, including Intel Corporation. For example, *i960 KA/KB Microprocessor Programmer's Reference Manual*, published by Intel Corporation, Order No. 270567-003, describes the programming of certain aspects of such a RISC processor and is hereby incorporated by reference.

Commercially available RISC processors operate at speeds ranging from approximately 33 MHz up to about 150 MHz or more. The described embodiment may operate, for example, at about 40 MHz. Desired operating speeds for the central processing unit 10 are determined by a variety of factors within the monitoring system and often are fundamentally determined by the characteristics of the external computer system 8 that is to be monitored. In this regard, it is the speed of the external computer system 8 in use, i.e., connected to a variety of system resources and performing real system operations (as opposed to operations which do not require interaction between the processor and other components of the external computer system), that primarily determines the rate of data transfers on the target bus of the external computer system. Typically, such an operational speed characteristic must be determined empirically for a given external computer system, because the actual data rates on a bus is a complicated function of a great many factors within the external computer system.

As illustrated in FIG. 1, the central processing unit 10 is coupled to a processor bus 12, which is preferably matched to the native word size of the central processing unit 10. In the described embodiment, the processor bus 12 is a thirty-two bit, high speed bus. Processor bus 12 provides the interface for communication between the central processing unit 10 and two special purpose buses 16 and 18, as well as to a direct memory access (DMA) controller 14. The first of these buses is preferably a thirty-two bit internal controller bus 16 which carries control signals, commands and data to and from various components within the monitoring system. A second bus accessible by the processor through the processor bus is preferably a sixty-four bit wide data bus 18 that provides a data path to the external computer system 8. Particular bus sizes are determined by the bus size of the central processing unit 10 within the monitoring system and by the bus sizes of the external computer system 8 to be monitored. In the described embodiment, the use of a thirty-two bit architecture for the processor dictates that a thirty-two bit controller bus structure is the most convenient for the monitoring system. Some of the currently available microprocessors that may be present in the external computer system 8 utilize bus architectures having either thirty-two bits or sixty-four bits. Because the data rates through the internal data bus 18 and to the logic analyzer buffer are an important factor in determining the performance of the monitoring system, it is preferable to utilize an internal data bus 18 that is as wide as the target bus within the external computer system 8. It is of course possible to couple the monitoring system to an external bus that is narrower or wider than the internal data bus 18. If for example, the internal data bus 18 were wider than the external bus, certain of the internal data bus lines would not be utilized for data transfers and an appropriate interface would have to be used.

The central processing unit 10, and thus the monitoring system as a whole, operates under the ultimate control of a management system. The management system incorporates data, command and user interfaces, and the rest of the functions necessary to the operation of the monitoring system. An external memory 22 is provided on the processor bus 12 for storing the management system, test procedures and criteria, and for storing any overflow from the data buffers within the monitoring system. The external memory 22 may consist of flash programmable memory, static random access memory (SRAM) or dynamic random access memory (DRAM). Additional memory may also be accessed by the monitoring system. By becoming master of the appropriate bus in the external computer system, the monitoring system can transfer data over the internal data bus 18 and store that data in memories within the external computer system. In some circumstances, this may allow the monitoring system to utilize some of the random access memory available within the external computer system. Under some circumstances, it may be desirable to store large quantities of data in a hard disk drive within the external computer system.

The monitoring system need not rely on mass storage within the external computer system. It may be desirable, for example, to provide disk storage that is dedicated to the monitoring system to ensure that data related to an external computer system error or inconsistency is available for analysis. Such an independent disk drive would be of particular value when the external computer system is for some reason unable to access its own disk drive. The provision of a memory that is accessible regardless of the operating condition of the external computer system may be important to the quick evaluation of whether a failed external computer system can readily be repaired. As an alternative to providing a dedicated disk drive, a flash programmable memory or other nonvolatile memory dedicated to the monitoring system could provide storage for data related to errors or inconsistencies in the external computer system.

A direct memory access (DMA) controller 14 is included in the monitoring system to provide direct memory access between all the various buses and the external memory 22. The DMA controller 14 enables various components of the monitoring system to directly access memory without use of the central processing unit 10, allowing the central processing unit 10 to continue performing other tasks. In preferred embodiments, DMA accesses are performed in between processor clock cycles so that block data transfers have relatively little impact on the processing resources of the processor 10. Although the DMA controller 14 in FIG. 1 is illustrated as a separate entity, the DMA controller 14 may be incorporated within the central processing unit 10. Certain of the 80960 RISC processors that might be used in preferred embodiments of the present invention incorporate a DMA controller within the processor. In such cases, the illustrated processor bus 12 may exist to some extent within the processor 10. The use of such a DMA controller existing within an available central processing unit has obvious benefits for the system design process. Accordingly, it is preferable to utilize a DMA controller that is integral to the processor for implementations of the present invention.

One of the primary functions of the controller bus 16 is as a command bus for transmitting commands from the processor 10 to various parts of the system. In addition, the controller bus 16 functions as a data bus under a variety of circumstances. For example, the controller bus 16 acts as a data bus for transferring blocks of data from the analyzer buffer 20 to either the processor 10 or the external memory 22 under DMA control. Boundary scan test data (i.e., test vectors, discussed in greater detail below) may be transmitted over the controller bus 16. The controller bus 16 may also be used as a data bus when the monitoring system communicates with the outside world, e.g., through the communication ports 26 or through the external system input/output block 40, such as when the monitoring system contacts a system administrator. A processor control interface 24 is disposed between the processor bus 12 and the controller bus 16 and consists of the logic and buffering necessary to separate the processor bus 12 from the controller bus 16. The processor control interface 24 includes one or more buffers to allow the synchronization of timing and control between the two buses. The depth of the processor control interface is controlled by the relative widths of the processor bus 12 and controller bus 16 and by the relative data transfer rates of the two buses. Preferably, the processor bus 12 and the controller bus 16 are of the same size and run at approximately the same speed, so that the processor control interface 24 is preferably a single control register capable of parallel input and output operations. In this preferred embodiment, the processor control interface includes a single, thirty-two bit FIFO (first in, first out) memory register.

The internal data bus 18 is the primary transfer path within the monitoring system for data captured from or concerning the external computer system 8. Presently preferred embodiments of a monitoring system in accordance with the present invention utilize a sixty-four bit data bus 18 so that the monitoring system can readily be interfaced to external computer systems having sixty-four bit buses, including those systems that incorporate native sixty-four bit processors. In one mode of operation, the data bus 18 within the monitoring system may be synchronized to whatever clock speed or data transfer rate that is utilized on the bus of the external computer system 8. In many cases, the bus of the external computer system will operate in an asynchronous manner. That is, there will be no clock signals on the bus; instead, one or more of the bus lines will be strobed to indicate the presence of valid data on the external system's bus. In such a case, the interface to external target 27 identifies strobe signals on the external computer system's bus and passes those strobe signals to the internal data bus 18 to signify the availability of valid data to be captured onto the data bus 18. These strobe signals will be included in the captured bus signals, and will serve to indicate the presence of valid data on the data bus 18 within the monitoring system. There are some instances when it will not be possible for the external computer system 8 to provide either a clock signal or a strobe signal for synchronization, and the internal data bus 18 will have to generate a clock or a strobe signal of its own. For example, the monitoring system may institute a particular set of external computer system tests by suspending operations within the external computer system 8 and then performing an array of diagnostic tests. In such an operational mode, the monitoring system becomes the bus master for the external computer system 8, generating the clock or strobe signals necessary for controlling both the external computer system's bus as well as the internal data bus 18. In this mode of operation, the clock speed or the data transfer rates utilized are set within the monitoring system rather than in the external computer system 8. Nevertheless, it is generally preferred that the data bus 18, and thus the bus of the external computer system 8, be maintained at or near the native speed of the external computer system to minimize incompatibility problems.

Figure 2:
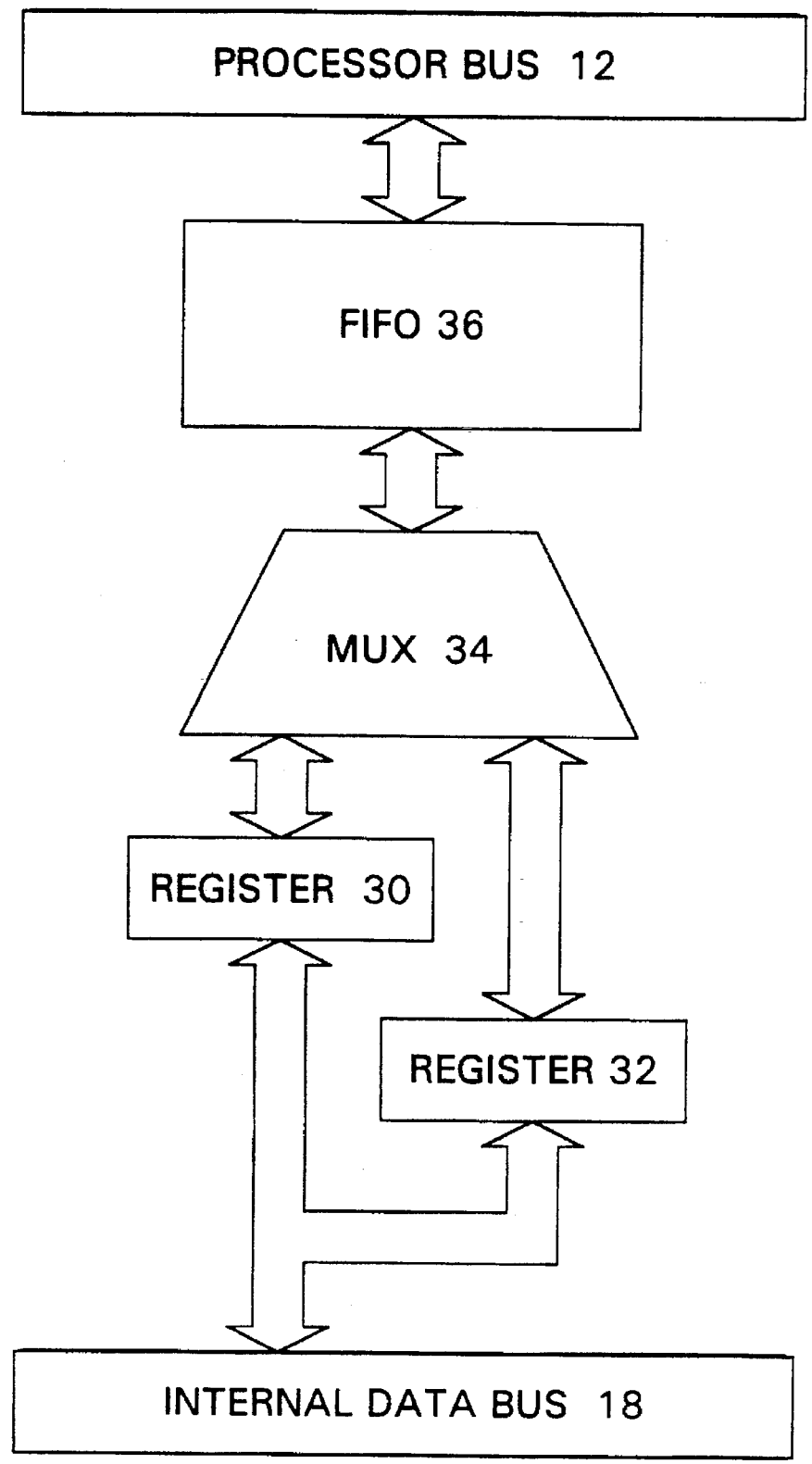
FIG. 2 is a schematic illustration of a data interface within the system of FIG. 1.

Typically then, the data bus 18 operates at the speed of the bus within the external computer system 8 so as to minimize the interfacing problems associated with coupling data from the external computer system 8 into the monitoring system. Consequently, the processor bus 12 and the data bus 18 may operate at different clock speeds or data transfer rates. A processor to target bus interface 28 is disposed between the processor bus 12 and the data bus 18 to separate and to serve as an interface between the two buses. Because the processor bus 12 and the data bus 18 are of different sizes and likely will operate at different data transfer rates, the control logic and buffering that make up the processor to target bus interface 28 may be somewhat more complicated than the processor control interface 24. Of course, if the processor bus 12 and data bus 18 are substantially similar, then the processor to target bus interface 28 can be relatively simple. A schematic representation of one embodiment of the processor to target bus interface 26 is provided in FIG. 2. In the embodiment of the processor to target bus interface 28 in FIG. 2, sixty-four bit words from the internal data bus 18 are divided into a high order thirty-two bit word and a low order thirty-two bit word by reading the input sixty-four bit word into a pair of registers, shown as Register 30 and Register 32 in the figure. The outputs of the two registers are provided in parallel to a multiplexer 34, which in turn passes the high and low order thirty-two bit words into a thirty-two bit wide FIFO 36. The FIFO 36 is made sufficiently deep to accommodate the different data transfer rates of the processor bus 12 and the data bus 18. Although the particular requirements for the FIFO 36 will depend on the type of data transfers made over the data bus 18, as well as the speeds of both the processor bus 12 and the data bus 18, typically the FIFO will hold between eight and sixteen thirty-two bit words. Conventional memory addressing schemes, including the protocols for keeping track of high order and low order thirty-two bit words, are preferably utilized for addressing data within the external memory 22.

Because the controller bus 16 typically operates at the speed of the processor 10 and the data bus 18 typically operates at the speed of the external computer system 8, the controller bus 16 and the data bus 18 generally have different data transfer rates. For some aspects of a monitoring system in accordance with the present invention, it is sometimes necessary for data to flow, at least indirectly, from the data bus 18 to the controller bus 16, requiring that the monitoring system compensate for the different data transfer rates of the two buses. One of the primary data paths within preferred embodiments of a monitoring system in accordance with the present invention is from the external computer system 8 through the interface 27 and the analyzer logic controller 42, and into the analyzer buffer 20. Large quantities of data may flow into the analyzer buffer 20 at the data rate of the external computer system. Much of this data may subsequently be transferred either to the processor 10 or the external memory 22. Data preferably backs up in the analyzer buffer 20 before being transferred from the analyzer buffer 20 to the external memory 22 or the processor 10. Burst mode DMA is preferably used to transfer data blocks from the analyzer buffer 20 to the processor 10 or the external memory 22. Thus, the different data rates of the controller bus 16 and the data bus 18 are compensated for by the buffering of the analyzer buffer 20 and by the rapid data transfers made available by burst mode DMA.

A second factor that allows the monitoring system to accommodate the different data transfer rates of different buses is that transactions in the external computer system are typically "bursty," that is, transactions tend to occur in brief intervals of concentrated activity. Thus, although data may occasionally back up in the data handling facilities of the monitoring system, it is very likely that a period of relatively few transactions will follow the burst of activity which created the data backup.

Under some circumstances, the rate at which data flows through the internal data bus 18, coupled with the rate at which data can be transferred from the data bus 18 through the processor to target bus interface 28 and to the processor bus 12, determines how fast the processor 10, and thus the processor bus 12, must operate. As discussed above, the speed at which the external computer system 8 operates is preferably determined empirically, because a real computer system will typically operate at a much slower rate than either of the nominal processor clock speed or the nominal bus data rates. The empirically determined data rate of the external computer sets the rate at which data flows into the processor to target bus interface 28. Taking into consideration the structure and speed of the processor to target bus interface 28, the speed of the processor 10 can then be set so as to prevent data from irretrievably backing up at the interface between the processor bus 12 and the data bus 18.

Alternatively, it may be the speed at which data must be transferred from the data bus 18, stored in the analyzer buffer 20 and then transferred through the processor bus 12 and to the processor 10 or the external memory 22, that determines how fast the processor 10 and the processor bus 12 must operate. When this data path represents the primary bottleneck in the monitoring system, the size of the analyzer buffer 20 also plays a key role in determining how fast the processor 10 must operate. Data must constantly be transferred from the external computer system 8 to the analyzer buffer 20, or there is a risk that data corresponding to transactions in the external computer system 8 might not be captured. The analyzer buffer 20 is a circular queue in which input data eventually overwrites previously stored data. How long data can remain in the analyzer buffer before being overwritten is a function of both the speed at which data flows into the analyzer buffer 20 and the speed with which data can be transferred out of the analyzer buffer 20. The processor 10 must operate sufficiently fast so that data stored within analyzer buffer 20 that has been identified for further analysis is transferred from the analyzer buffer 20 before the data incoming from the data bus 18 is written over the identified data. Thus, in some circumstances, the speed necessary for the processor 10 is determined by the speed of the data bus 18, the size of the analyzer buffer 20, and the speed of DMA transfers from the analyzer buffer 20 to the processor bus 12.

Preferably, block data transfers made over the controller bus 16, e.g., DMA transfers from the analyzer buffer 20 to the external memory 22, are made in 4K data blocks. Similarly, data transfers from the processor to the external computer system, or vice versa, are preferably made in 4K data blocks. This is a convenient data block size because it is the native memory page size for many microprocessors as well as many commercially available memories. By utilizing a 4K data block size, the memory addressing requirements of the present system are minimized, since memory transfers are then made based only upon the starting address for the transfer, with the presence of a 4K block of data being assumed for page mode memory transfers.

Referring again to FIG. 1, one of the most basic system tests available in preferred embodiments of the present monitoring system is embodied in the voltage, temperature and reset block 38. The voltage of the external computer system is monitored through a connection between the monitoring system and the motherboard of the external computer system. An alarm is set to notify the external system or an external computer system monitor, such as a network system administrator, if the voltage of the external computer system varies beyond a predetermined operational range. A temperature of the external computer system is monitored through another connection between the monitoring system and the external computer system. This temperature measurement typically monitors a temperature sensor installed within the fan of the external computer system. Fans including such temperature sensors are readily available, and typically provide a temperature signal as an analog voltage that is converted within the voltage, temperature and reset block 38 to a digital temperature signal. Here again, an alarm may be set to immediately notify the external system or a system administrator if the temperature of the external computer system varies beyond a predetermined range. More particularly, this alarm may be set to go off if the temperature sensor indicates that the external computer system temperature has risen to a level at which elevated error rates can be expected to occur. A third basic system monitoring tool included within block 38 is a reset detector. Under some circumstances, the monitoring system will not be able to detect either a soft reset or a full system reset in the external computer system. Accordingly, the voltage, temperature and reset block may be coupled to the reset lines on a bus within the external computer system. Reset lines are typically provided in computer systems, but these lines are often only monitored by a few of the system components in the external computer system. Preferably, the monitoring system is coupled to the reset lines within the external computer system to detect both soft and hard resets so that the monitoring system can take appropriate actions to accommodate, log and report the nature of the reset.

The voltage, temperature and reset block 38 is coupled to the external system input/output block 40 that resides between the monitoring system and the external computer system. External system input/output block 40 represents the software and hardware used for general communications between the monitoring system and the external computer system. Results of tests performed by the voltage, temperature and reset block 38 are typically reported to the external system input/output block 40 so that, if one of the basic system tests embodied within block 38 is failed, the external computer system can be immediately notified of the error. If the results of these tests indicate that the external computer system is not operational, then the monitoring system may send a reset command to the external computer system. In the alternative, or additionally, the test results can be reported to a system administrator or a system monitor for the external computer system. Network connections between an external computer network (not illustrated) and the monitoring system are most readily accomplished through the external system input/output block 40.

A second communication facility within the monitoring system is a set of high speed serial communication ports 26 that comply with the RS-232 standard. These ports may additionally be coupled to a modem to allow for dial up access of the monitoring system by a remote computer system or, alternatively, for dial up access of a remote computer system by the monitoring system. This capability allows a remote computer system to make contact with the monitoring system so that the remote computer system can determine the operating condition of the external computer system or so that the remote computer system can initiate diagnostics on the external computer system, Additionally, the monitoring system can be programmed to contact a remote computer system if an error of a particular type is identified in the external computer system. By providing two RS-232 ports, it is possible for a remote computer system to be directing the monitoring system to perform tests on the external computer system over one port, while the monitoring system is transferring test results to the remote computer system using the second port. Provision of two ports allows for the faster diagnosis of errors in the external computer system by a remote computer system.

The primary monitoring and diagnostic function illustrated in the FIG. 1 embodiment of the monitoring system is what is referred to herein as "signature analysis." In signature analysis, a subset of the total data available on the bus of the external computer system is captured into the monitoring system. A combination of filtering and triggering techniques are used to identify subsets of the data on the target bus of the external computer system which are sufficiently compact to allow high speed data transfers and analysis, while still being sufficiently complete to unambiguously identify and describe a transaction on the target bus. This data subset is then used to characterize the transaction and, more particularly, to identify target bus transactions which are inconsistent with the normal operation of the external computer system. Typically, a transaction refers to a distinct operation within the external computer system, such as a memory access or the transfer of an instruction to an I/O device, but might also refer to a sequence of events or operations. After capture, the data subset representative of the identified transaction is provided to the processor 10 which compares the data subset, or "transaction signature," to previously obtained "known good data signatures" that are characteristic of the external computer system during normal, error free operation. Identification of data signatures that are inconsistent with the known good data signatures allows the monitoring system to identify and analyze the operation of the external computer system.

The first step in signature analysis is preferably to identify and capture data subsets from the bus of the external computer system that can be used to perform signature analysis. The primary filtering and triggering capabilities of the presently preferred embodiment of the monitoring system are disposed within the analyzer logic controller 42, shown in FIG. 1. To illustrate the operation of the analyzer logic controller 42, a particular embodiment of the present invention in which the monitoring system is coupled directly to the processor bus of the external computer system 8 is described. This particular embodiment relates to an external computer system having an asynchronous bus so that bus timing is controlled by strobe signals on the bus. It is to be understood that the particular implementation of the monitoring system will vary to greater or lesser extents depending upon the nature of the bus to which the monitoring system is interfaced and depending upon the nature of the external computer system. Regardless, embodiments of the present invention can be used to monitor a variety of different types of buses and a variety of different types of external computer systems. Moreover, a monitoring system in accordance with the present invention can determine if the transactions occurring on such other buses are consistent with the normal operation of those buses and can be used to analyze the operation of such other types of external computer systems.

In one operational mode, the monitoring system captures data from the processor bus of the external computer system 8. The capture operation can be triggered by any sort of signal on the processor bus that is indicative of the occurrence of a transaction in the external computer system 8. Most simply, data from the external system processor bus is latched into the monitoring system each time a strobe signal appears on the external system processor bus signifying the presence of valid data on the external bus. Subsequent processing to more specifically identify the data to be captured is performed later in the analyzer logic controller 42. For this configuration, the interface to external target 27 consists of a set of tri-state latches that are activated upon detection of an appropriate strobe signal on the target bus of the external computer system.

More complicated triggering schemes could readily be implemented for the initial capture of data from the external computer system into the monitoring system. In the presently preferred embodiment of the present invention, however, the interface to external target 27 is a relatively simple data interface between the external computer system and the monitoring system. This allows the monitoring system to access memories in the external computer system 8 over data bus 18 in a relatively simple, high speed manner.

Data latched from the target bus of the external computer system by the interface 27 is provided to the internal data bus 18, which in turn provides data to the analyzer logic controller 42 where a number of operations are performed on the data. In preferred embodiments of the present invention, the analyzer logic controller 42 is designed to capture a complete external target bus transaction, which requires that the analyzer controller 42 identify a transaction on the target bus of the external computer system and establish the time domain around that transaction that is relevant to analyzing that transaction. To this end, the analyzer controller 42 includes logic to start a trigger, to end the trigger and to control the temporary storage of data captured from the external bus. Data from the external bus is stored temporarily within the analyzer buffer 20 on a continuous basis. Thus, when a portion of the analyzer logic controller 42 identifies a triggering event, the data from the external bus associated with that transaction has already been stored in the analyzer buffer 20 so that a collection of data consisting of the data captured during a time interval prior to the triggering event and during a time interval following the triggering event is available within the analyzer buffer 20 for further analysis. Analyzer logic controller 42 defines a data capture window within the total set of data available in the analyzer buffer 20. The data capture window consists of a predetermined number of captured bus words collected immediately prior to the triggering event plus a predetermined number of captured bus words collected immediately after the triggering event. Once a triggering event is identified and the analyzer logic controller 42 has established the desired data capture window, the analyzer logic controller 42 preferably time stamps the captured data associated with the triggering transaction and initiates a DMA transfer of this data block from the analyzer buffer 20 to the external memory 22. Additionally, a "tag" identifying the triggering transaction is also stored in the header appended to the captured data block. This tag preferably provides as much information about the triggering transaction as may readily by derived using simple logic. For example, the tag may identify the strobe or triggering signal that caused the data set to be captured. Providing such a tag can greatly speed the later characterization of the transaction data set that is preferably performed in preparation for signature analysis.

Generally, it is preferred that no additional data be written to the analyzer buffer 20 for a period of time following the identification of the triggering event so that the data representative of the transaction on the external bus that generated the trigger event can be preserved. This may be accomplished in any of a number of different ways including, for example, disabling the data capture facility of the interface to the external target 27. No additional data would be captured from the external computer system until the operations necessary to preserve the desired data block were complete. After the data associated with the triggering transaction is transferred to the external memory 22, the monitoring and capture of data from the external bus is reinitiated, and captured data is once again written into the analyzer buffer 20. Preferably, the speed of the monitoring system is sufficiently great that little or no data is lost while data transfers are being effected.

The analyzer buffer 20 is organized as a circular queue, with data blocks written into consecutive contiguous memory segments until the physical limit of the buffer 20 is reached. At that time, memory storage is redirected to the physical start of the buffer 20. In the absence of a signal indicative of the detection of a triggering event, data within the analyzer buffer 20 is constantly overwritten. A register is incremented to indicate the storage position within the buffer 20 to which the most recently captured data block is to be written. The address stored in this register is saved when a triggering event occurs to indicate the position within the memory defining the triggering event, which becomes the zero position for establishing the data capture window around the signal data set associated with the triggering transaction. The extent of the data capture window that corresponds to the user-selected time interval prior to and subsequent to the triggering event is defined as a set of memory offsets determined from the address of the triggering event data set saved within the analyzer buffer 20.

Preferably, this saved address, taken in combination with the memory offsets corresponding to the selected time interval, is utilized to define the extent of the memory block to be transferred to the external memory by the DMA controller 14. Once the extent of captured data block is defined, a DMA transfer of a 4K memory page following the start address is preferably used to transfer data out of the analyzer buffer 20.

Within the analyzer logic controller 42, parallel data paths accommodate the filtering and temporary storage of captured data and allow the analyzer logic controller 42 to perform compare operations on the captured data to identify bus words within the captured data that are typically associated with transactions on the target bus. Along one data path within the controller 42, data captured from the external system is compared against a set of predetermined triggering masks to identify transactions on the external target bus. Simultaneously, the captured data passes along a second data path within the analyzer logic controller 42 for storage in the analyzer buffer 20. Preferably, a filter disposed along this data path identifies that portion of the captured data that is most relevant for diagnosing problems in the external computer system and stores only that relevant data within the analyzer buffer 20. For example, the filter may cause only the data and address bits within captured bus data to be saved. Other filtering techniques are readily implemented. Incorporation of such a filtering technique allows a form of data compression to be performed on the input data stream, so that the storage requirements for the analyzer buffer 20 may be reduced or more data regarding a transaction can be stored.

Figure 3:
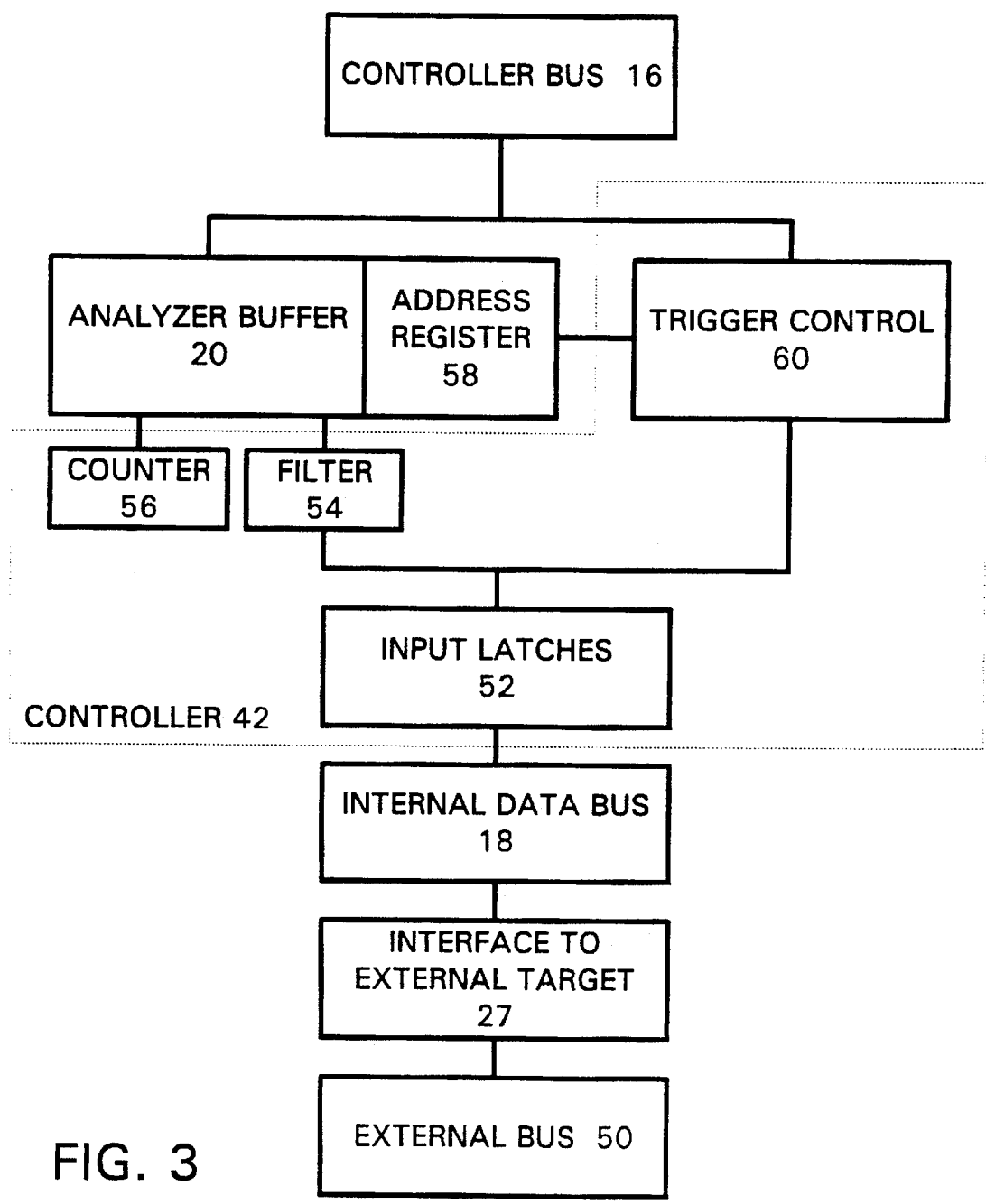
FIG. 3 is a schematic illustration of a logic analyzer controller in accordance with the present invention.

FIG. 3 illustrates the structure of an embodiment of the analyzer logic controller 42 in greater detail. Circuitry along both data paths within the analyzer logic controller 42 is controlled by the central processing unit 10 through the controller bus 16. The analyzer logic controller 42 interfaces with the external bus 50 of the external computer system through a set of input latches 52, which may function in a manner similar to the interface to the external target 27 (shown in FIG. 1). Data from the external bus 52 are latched into the input latches 52 upon identification of a strobe signal or other triggering event on the data bus 18. Data from the input latches 52 are preferably provided to filter 54 before being stored in the buffer 20.

It is not necessary to capture all of the data on the external bus to perform signature analysis. Signature analysis within the monitoring system can be performed on any subset of the data from the external computer system. It is frequently possible to identify a signature associated with an erroneous or failed transaction based on a relatively small subset of the total data that could be captured from the external computer system. The size and the exact nature of the data set that is necessary for identifying a problem or potential error varies from system to system, but can be empirically determined by monitoring the processor bus with a standard data analyzer as the system performs a variety of different transactions. By limiting the size of the data set that is analyzed to identify and characterize errors, it is possible to include a wider range of test conditions and to sample the external computer system more frequently.

The filter 54 acts to eliminate data of lesser relevance to the reconstruction of the transaction on the target bus that generated the triggering event. Filter 54 may vary greatly from system to system. In general, the filter 54 consists of one or more masks and patterns that are significant in identifying the nature of a particular transaction in the external computer system. By storing only those valid data words, or portions of data words, that are necessary to identify and characterize a transaction, a form of data compression is accomplished so that the amount of memory that must be provided within the analyzer buffer 20 can be reduced. In addition, decreasing the total amount of data stored for a particular transaction decreases the amount of time required to perform a DMA operation to transfer the data associated with a particular triggering event out of the analyzer buffer 20. Faster DMA operations may reduce the need for higher speed processor performance and may reduce the amount of time in which DMA operations interrupt data capture and analysis. In the presently preferred embodiment of the present invention, it is desirable to reduce the stored data set to the minimum amount of information necessary to unambiguously identify the triggering transaction that occurred in the external computer system. If, on the other hand, the physical size of the buffer 20 and the time consumed by DMA operations are not important considerations for a particular implementation of a system, then there would be less desirability to filter captured data prior to its storage in the analyzer buffer 20. Additionally, there may be modes of operation in which the filter 54 would not be operational, so that data passes through the filter 54 uninterrupted.

Data passing through the filter 54 is stored in the analyzer buffer 20 in accordance with the address of the next available memory position as stored in register 55. The register 55 is incremented after each data word is written into the buffer 20. Register 55 is preferably coupled to the trigger control circuit 60 so that, when a triggering event is identified, the address within register 55 is saved to identify the zero point of the data capture window associated with the transaction which generated the triggering event. A subsequent DMA transfer of the data associated with the transaction is then made with reference to the address saved in register 55.

A counter 56 is provided to time stamp each block of data associated with an external computer system bus transaction captured and stored to the analyzer buffer 20. Use of counter 56 is particularly preferred when a monitoring system in accordance with the present invention is utilized with an external computer system that utilizes an asynchronous external bus 50. Because no clock is present on the asynchronous external bus 50, there would be no time information within the stored data if the captured data were not time stamped. Time stamping allows the captured data, when decompiled and reconstructed, to be displayed along a time access in the manner conventionally utilized in logic analyzers. Such a time resolved display provides additional information that can be used to identify and diagnose problems in the external computer system. In practice, the counter 56 is a cyclic clock that outputs a count that corresponds to the relative time between successive transactions captured from the external bus 50 and stored into the analyzer buffer 20. A suitable counter is desirably sufficiently fast to provide substantial time resolution for a logic analyzer display. To monitor an external computer system incorporating a microprocessor using an internal clock rate of one hundred megahertz, an appropriate counter 56 might use a ten nanosecond clock cycle. The count output by the counter 56 is preferably stored in the analyzer buffer along with the captured data block. It is generally desirable to store the count, along with a tag signifying the nature of the captured transaction, in a header file appended to the captured data block. An appropriate tag identifying the transaction may be derived, for example, from a subset of the bus signals associated with the transaction or from the interrupts, strobes or other signals used to generate the trigger signal for that particular transaction.

The other data path within the analyzer logic controller 42 preferably provides a trigger control circuit 60 to identify the occurrence of a transaction in the external computer system from the data words present on the target bus of the external computer system. Typically, transactions can be separated into broad groups on the basis of certain combinations of signals on either the address lines or the data lines of the target bus. In other circumstances, the trigger control circuit 60 might be programmed to trigger on the first strobe signal that appears after a particular interrupt request or after a particular series of interrupts. Still more complicated triggering strategies might be implemented, such as triggering only upon the identification of a predetermined succession of data words on the external bus. The advantage of using more sophisticated triggering sequences is that less total data is captured from the external computer system so that less data need be processed within the monitoring system. Moreover, the captured data can be limited to particular types of transactions in the external computer system so that information known to be of little relevance can more readily be disregarded. The use of transaction-specific triggering schemes to identify data to be captured from the external computer system is preferred because it is often possible to limit the data analysis to those transactions in the external computer system that are most frequently prone to failure.

Figure 4:
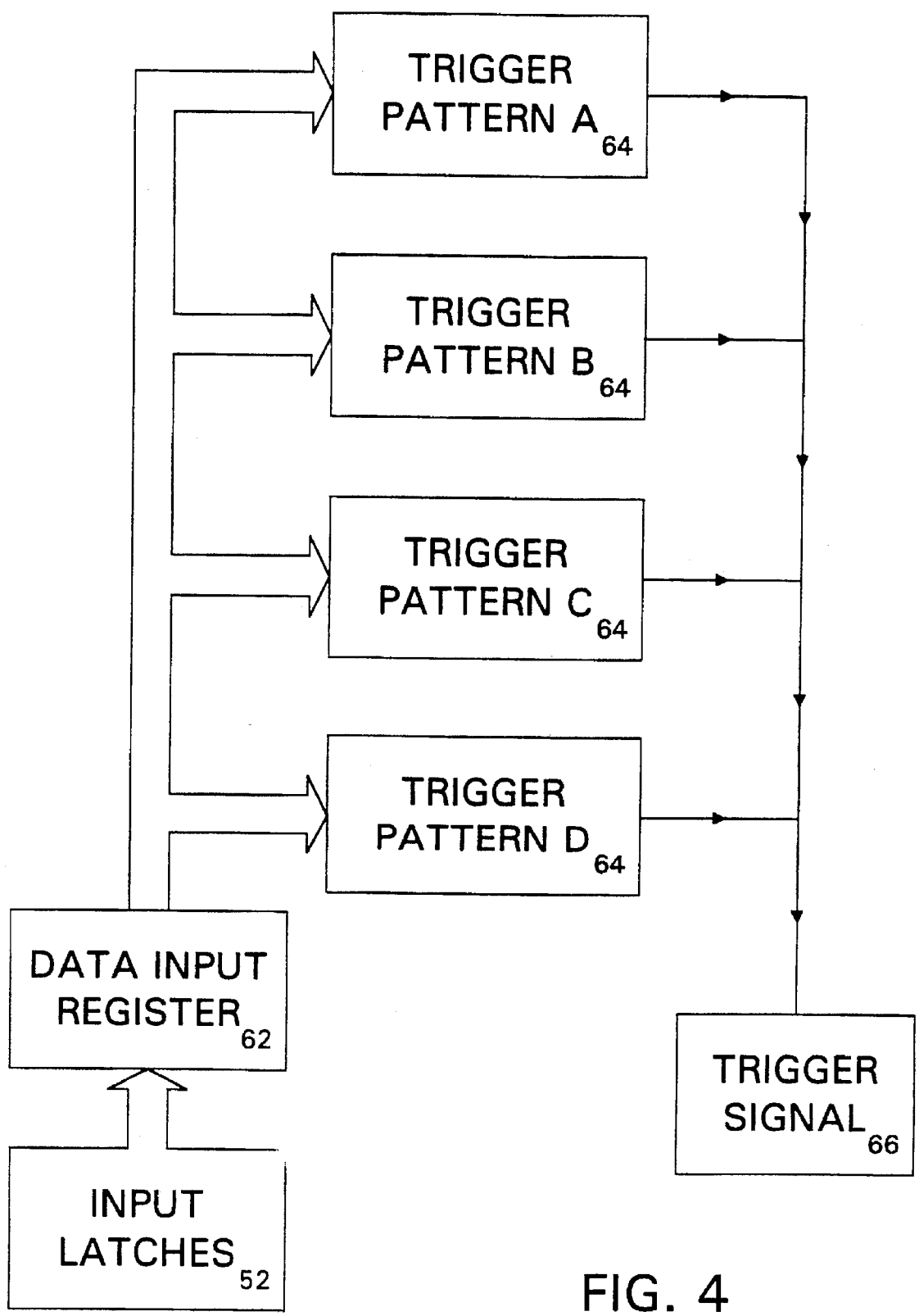
FIG. 4 is a schematic illustration of a trigger circuit in accordance with the present invention.

FIG. 4 illustrates one configuration of the trigger control circuit 60. In this embodiment, four registers 64 (Registers A–D) are provided for storing masks consisting of data words or portions of data words that can identify the occurrence of a transaction on the external bus. A data word input to the trigger control circuit 60 from the input latches 52 is preferably latched in a data input register 62. The latched data word is then compared to the four trigger mask patterns stored in the four registers 64, and if any of these comparisons detects a match, a signal indicative of the match is generated and output from the trigger signal circuit 66 to other portions of the logic analyzer and to the DMA controller 14, which initiates a DMA transfer in response to the output of trigger signal circuit 66. It is not always necessary to make comparisons on all of the bits within an input data word to identify a transaction in the external computer system. Particular subsets of bus lines may provide all of the information that is necessary for detecting a transaction on the external bus 50.

In the illustrated embodiment, four registers 64 are shown, but depending on the amount of space available for the trigger control circuit 60, different numbers of mask registers may be provided. There is a substantial processing speed penalty if too many comparisons are required on each input data word. Accordingly, presently preferred embodiments of the monitoring system include between four and eight mask trigger registers 64. The present inventors have found that this number of registers can sufficiently identify the occurrence of a number of different transactions.

Triggering can be performed in other ways. For example, a sequence of input data words could be sequentially passed to a series of registers 64 that store a series of predetermined data signatures that together represent a sequence of external bus events. In this configuration of the FIG. 4 embodiment, a series of four input data words pass to a series of registers so that the first data word is compared to Trigger Pattern A, the second data word is compared to Pattern B, and so on. Each of the registers 64 generate a signal indicative of whether the respective input data word matches the trigger pattern stored in that register. The trigger signal circuit generates a trigger signal if the input data word matches all of the masks within the four registers 64. In this way, the analyzer logic controller 42 may be programmed to capture a bus transaction on the basis of a series of data words indicative of a single bus transaction or a particular series of bus transactions. Alternately, the trigger control circuit illustrated in FIG. 4 might be configured so as to generate a trigger signal only if the input data set does not match any of the trigger mask patterns within the registers 64. As yet another alternative triggering scheme applicable to the FIG. 4 configuration, a set of signatures associated with particular known bad transactions might be used to identify the occurrence of one of a known subset of erroneous transactions.

Typically, there is insufficient time during the normal operation of the external computer system to alter the set of trigger mask patterns stored within the registers 64 of the trigger control circuit 60. Thus, a single set of trigger masks will normally have to suffice to identify errors or inconsistencies during the normal operation of the external computer system. Additional trigger mask patterns suitable for specialized testing functions may be stored in the external memory 22 (shown in FIG. 1) and loaded as necessary under control of the processor 10. Thus, if a particular condition is identified in the external computer system by the monitoring system, a specialized set of trigger mask patterns can be loaded into the trigger control circuit 60 to more particularly identify transactions for which data is to be captured. Use of specialized trigger mask pattern sets allows the monitoring system to further analyze the external computer system more rapidly and in greater depth than is possible using only a single trigger mask pattern set. Nevertheless, if it is more practical to include only a single set of trigger mask patterns, for example due to memory considerations, then only that set of trigger mask patterns need be provided. In the alternative, a variety of different trigger mask patterns can be loaded on demand to perform diagnostics such as might be performed during preventative maintenance on the external computer system. Such preventive maintenance is preferably implemented during a period of low external computer system usage or during a period of time exclusively devoted to preventative maintenance.

Passing data through the trigger control circuit 60 to identify erroneous or inconsistent bus signals is a somewhat time consuming process, with the amount of time required depending on the nature of the comparison operations performed. Buffering in the analyzer logic control 42 allows data to be stored as fast as it is input from the external bus 50. Analysis of the data within the trigger control circuit 60 is then performed as possible. Processing in the external computer system, and thus the rate at which data is captured from the external bus 50, typically occurs in concentrated time intervals. Because the external system is idle a considerable fraction of the time, there will typically be periods of low rates of data input into the monitoring system. These periods of low data influx allow the monitoring system to catch up with the external system, even if the native speed of the external system is greater than that of portions of the monitoring system.

Figure 5:
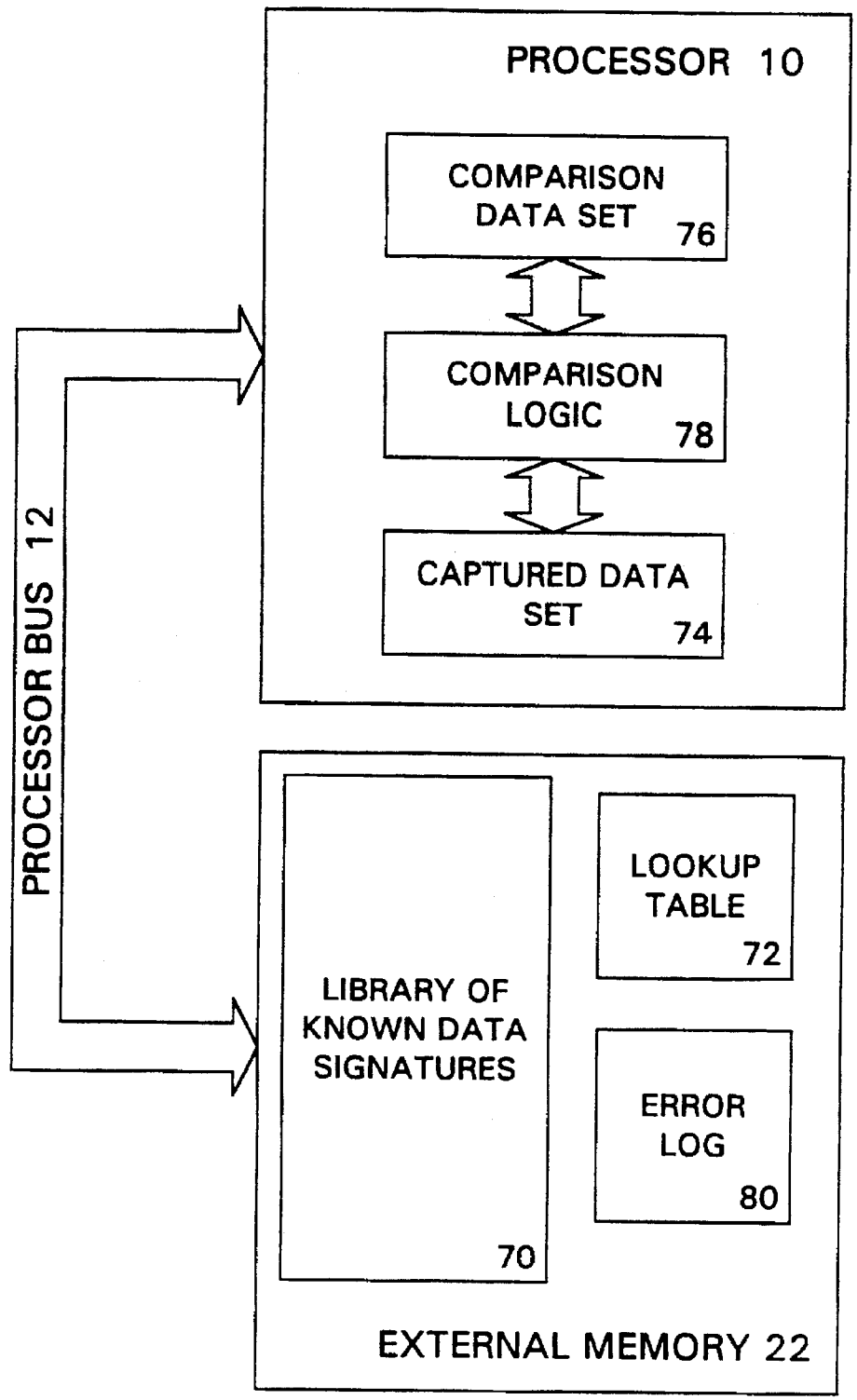
FIG. 5 schematically illustrates aspects of a monitoring system incorporating a signature analysis capability.

After data characteristic of a particular transaction on the target bus is captured and stored in the external memory 22, or alternatively in the processor 10, the monitoring system then performs signature analysis to identify erroneous or inconsistent external bus data generated by the external computer system. Preferably, signature analysis is performed by the processor 10 by comparing the captured data set associated with the triggering transaction with a "known good data signature" stored within the external memory 22 characteristic of an error-free bus transaction in the external computer system. If the captured data set is sufficiently identical to the known good data signature stored within the memory 22, then the transaction is identified as a normal one and generally no further action is taken. If, however, the captured data set does not match the known good data signature, the processor 10 identifies the transaction as an inconsistent and possibly erroneous one, and generally logs the occurrence of the inconsistent transaction. Under some circumstances, primarily controlled by the predetermined configuration of the monitoring system, the data associated with the inconsistent transaction may be saved or the external system may be notified of the inconsistent transaction. Additional actions may be taken, depending on how many erroneous transactions occur and on the severity of the threat posed to the continued operation of the computer by the inconsistent transaction. This procedure is illustrated schematically in FIG. 5, and is discussed in greater detail below.

In preferred embodiments of the present invention, a library 70 of known data signatures, whether exemplary of good transactions or exemplary of erroneous bus transactions, is preferably stored in a non-volatile portion of external memory 22. An appropriate library of known good data signatures associated with certain external computer system transactions may be derived by obtaining data signatures for target bus transactions at a time when there is a high level of confidence that the external computer system is operating correctly. For example, these known good data signatures may be obtained immediately after system burn-in and verification. To ensure that these "known good data" signatures represent error free operation, the data signatures may be compiled from repeated samplings of the external bus 50 for a series of identical transactions. If, for example, a total of ten consecutive signatures for a given transaction are identical, then that signature can be adopted as the known good data signature for that transaction. Once a set of known good data signatures have been compiled for a set of desired target transactions, the known good data signatures are stored in external memory 22, preferably in non-volatile external memory, such as flash programmable memory. Typically, this library of known good data signatures will be appropriate for any external computer system that includes the same basic hardware elements and is configured in a substantially similar way. Accordingly, it is generally desirable to establish a set of known good data signatures for a particular type of external computer system and to program this library of data signatures into a ROM within the external memory 22 of the monitoring system coupled to that external computer system. The library 70 of known data signatures may be acquired by a monitoring system in accordance with the present invention or by conventional logic analyzer and bus analysis equipment. In particularly preferred embodiments of the present invention, the data signature library 70 is installed in a flash programmable ROM so that the library can be updated after initial installation.

As an addition to the library of known good signatures, or as an alternative to the library of known good data signatures, a library of known bad data signatures may be established during the course of normal use of the external computer system. Certain types of errors within a computer system may be reported over error lines on one or more buses within the computer system. For example, a failed memory access will generally cause an error signal to be generated and placed on the bus. The monitoring system may be programmed to identify such an error signal, capturing the data signature associated with the failed memory access, and storing this bad data signature within external memory 22 for future reference in detecting or analyzing future transaction signatures. Of course, the library of known bad transaction signatures may also include data obtained by other data identification methods. The library of data signatures associated with known erroneous transactions can be used to identify bad transactions by comparison, to confirm the occurrence of a bad transaction preliminarily identified by other methods, or the library can be used to identify a captured data set that does not correspond to the known good transaction signature associated with the triggering transaction.

Once an appropriate library 70 of known data signatures are stored within the external memory 22, subsequent data sets associated with external bus transactions can be compared with the known data signatures to determine if the captured data set is consistent with the normal operation of the external computer system. To facilitate the signature comparison process, it is generally preferred that information be appended to the data set regarding the nature of the transaction which triggered the capture of the data set, as discussed above. This information may, for example, indicate the nature of the strobe signal or triggering event which generated the triggering event within the trigger control circuit 60. This initial identification will generally characterize the triggering transaction into a category of types of transactions. It is generally preferred that the captured data be further characterized within the processor 10 prior to recalling known data signatures from the library 70 within the external memory. Further identification of the captured data set is important to the processing speed obtained by certain embodiments of the present monitoring system, for several reasons. A considerable amount of time is required to load data sets from the external memory 22 into the processor 10, so it is desirable to load no more known signature data sets than are necessary to perform signature analysis. Additionally, compare operations are time consuming. Thus, it is desirable that as few comparisons as are necessary to perform signature analysis be performed in the monitoring system.

To further identify the captured transaction data set, the processor 10 may decode and decompile some portion or all of the captured data set. This procedure will typically be performed by software executed within the processor, and is a function not unlike that performed by the processor or I/O device in the external computer system that was the target of the data set captured from the external bus. It is preferred that only as much of the capture data set be decoded as is necessary to unambiguously identify the transaction which generated the triggering event. Together with the tag information preferably appended to the captured data set by the logic analyzer controller 42, the decoded and decompiled transaction data set forms an identification of the captured transaction data set. Preferably, the known data signatures are stored in the external memory 22 so that a desired known data signature can be recalled from memory in accordance with this identification information derived from the captured transaction data set. For example, the identification information may form or be converted into an address to a memory location within a lookup table 72 within external memory 22, which memory location stores the address of the known data signature associated with the captured transaction. It may be convenient to implement the look up table as a ROM within external memory 22. This address identifies the location within the library 70 from which the known good data set can be retrieved by DMA controller 14.

When signature analysis is performed on a captured transaction data set, the data set associated with the triggering transaction must be transferred from the external memory 22 to a section 74 of memory within the processor 10, unless the data set is already present within the processor. It is generally convenient to load the captured data set into the processor memory 74 prior to recalling the comparison signature data from the external memory 22. The transaction identifying tag is read from the header of the data block in which the captured data set is stored either before or after the captured data set is loaded into the processor 10. Processor 10 preferably further identifies the transaction, and the lookup table 72 is accessed to identify the triggering transaction with the address within library 70 that holds the known data signature associated with the transaction. The appropriate known data signature is recalled from memory 22 and stored into a section 76 of memory within processor 10 and comparison logic 78 compares the captured data set with the comparison data set, which may be, e.g., the known good data signature associated with the triggering transaction. In preferred embodiments of the present invention, the processor 10 performs bit-wise comparison of corresponding data words within the captured data set and the comparison data set.

The data comparison performed within the processor establishes how completely the captured transaction data set matches the known data signature. Depending on the particular implementation of the present monitoring system, it may be desirable to identify any variations between the two data sets, and denote that inconsistency as an erroneous transaction. The occurrence of the erroneous transaction may be noted in an error log 80, which may be a non-volatile memory within the external memory 22, and the data set associated with the erroneous transaction may be stored for future analysis. In some cases, it may be desirable to report inconsistent bus transactions to the external computer system or to report the inconsistent bus transactions to a remote computer system. In other cases, the present monitoring system may perform data analysis to determine if the frequency and severity of errors increases beyond a predetermined level before alerting external systems to deteriorating conditions within the external computer system.

The preceding discussion has set forth embodiments of the logic analyzer aspects of the present invention. The following discussion sets forth embodiments of the present invention particularly related to the boundary scan testing aspects of the present invention. A particularly preferred embodiment of the present invention incorporates both logic analyzer aspects of the present invention as well as boundary scan testing aspects of the present invention.

Hardware for Boundary Scan Monitoring Strategies.

In accordance with an aspect of the present invention, the monitoring system is capable of initiating and interpreting a boundary scan analysis of those portions of the external computer system that are compatible with boundary scan testing. Boundary scan testing can be initiated in response to the detection of certain conditions in the external computer system, such as the detection of an inconsistent bus transaction by signature analysis, or the detection of an out of range voltage by the voltage, temperature and reset block 38. Boundary scan testing can be implemented under other circumstances, as well. For example, boundary scan testing of the external computer system may be initiated by a remote computer system to diagnose an external computer system which has been reported to be malfunctioning. The monitoring system might regularly implement a range of boundary scan testing in periods of low computer usage as part of a preventive maintenance procedure.

Boundary scan testing is a testing methodology typically practiced in the initial manufacture, burn in and verification of system components and in the initial testing of board level products. Generally, boundary scan testing refers to a standardized testing architecture that is incorporated into system components that are in compliance with a set of standards for component testing. This set of standards describes the signal and control lines that must be supplied to comply with the boundary scan architecture, the protocol for test initiation and internal test flow, and many other aspects of implementing boundary scan. The standardized aspects of the boundary scan architecture are set forth in the IEEE Std 1149.1-1990 and IEEE Std 1149.1a-1993, IEEE Standard Test Access Port and Boundary-Scan Architecture, and are hereby incorporated by reference.

Figure 6:
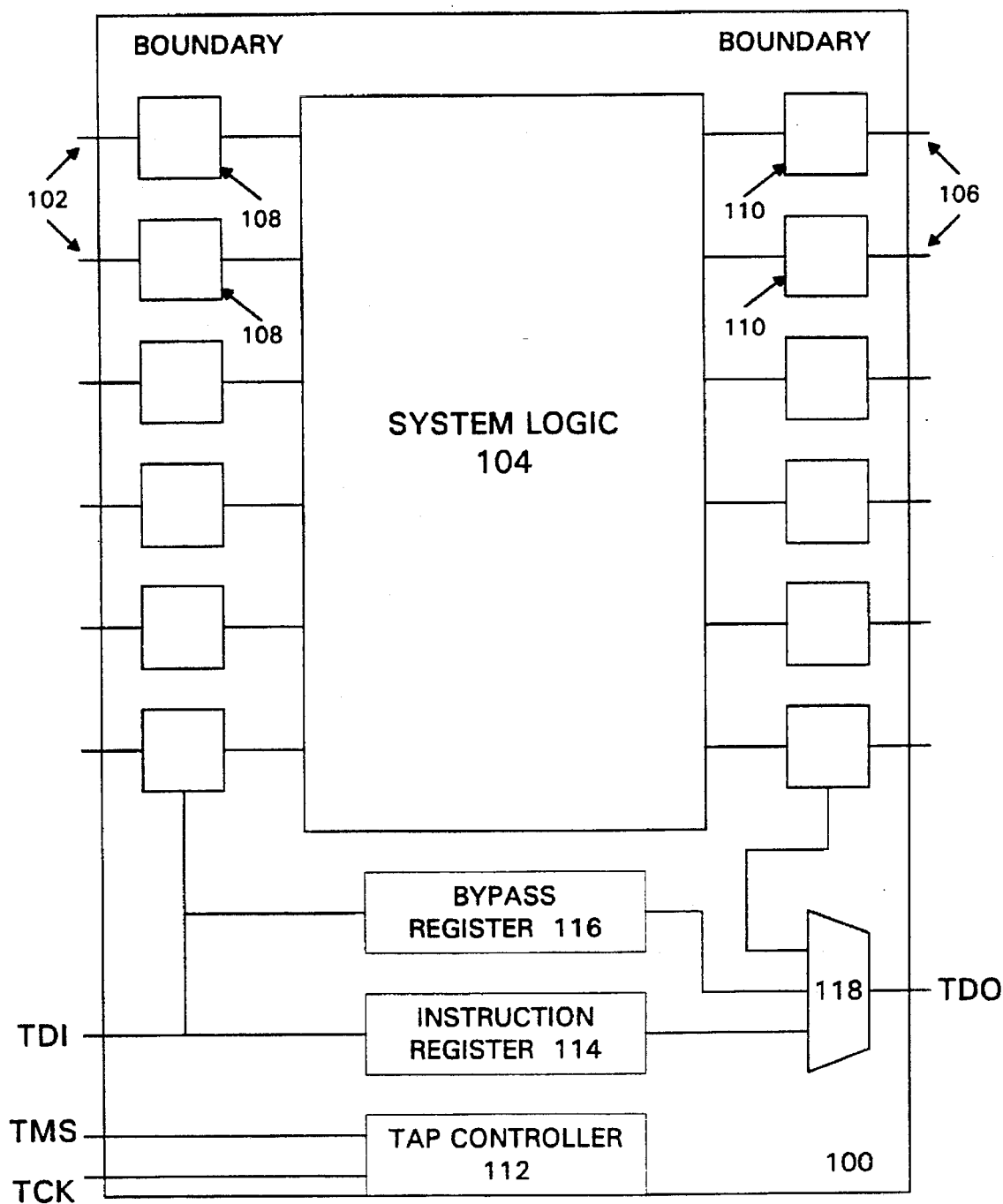
FIG. 6 is a schematic illustration of a system component that incorporates boundary scan testing capabilities.

FIG. 6 is a schematic illustration of a system component incorporating an internal test facility operating in accordance with a boundary scan architecture. Device 100 is representative of a device which includes a boundary scan internal testing facility and may be, for example, a memory, a processor, glue logic, or other system components. Input pins 102 provide a data path into the system logic unit 104 and output data pins 106 provide a data path out of the system logic 104. Part of the modification to the normal system component architecture to accommodate boundary scan testing is the addition of a test input register 108, which is disposed along the data path from the input pins 102 to the system logic 104. A similar data register 110 is provided along the data path from the system logic 104 to the output pins 106. When the system component 100 undergoes boundary scan testing, a boundary scan test vector is input to the register 108 and latched into the register 108.

An appropriately designed test vector input to the system logic 104 along the normal input data path, can be used to evaluate the function of the system logic 104 within system component 100. The test vector input to the system logic 104 is processed by the logic and the result is output and latched into the output register 110. This output test vector can be compared to the expected output test vector to determine if the system logic 104 is operating normally. In a similar fashion, collections of system components, such as interconnected boundary scan compatible devices, can be tested as a complete logic block. Testing of collected system components can by utilized to test the interconnections between individual system components.

Boundary scan testing is initiated from a boundary scan tester external to the device under test. Four signal lines are provided to the system component 100 under test. A test clock input (TCK) provides a clock signal for the testing logic within the system component 100, and is provided to a test access port (TAP) controller 112 within the boundary scan device 100. A second signal provided to the TAP controller 112 is the test mode select (TMS) which is a signal that, when decoded, controls the progression of testing operations. The third input signal to the boundary scan device 100 is the test data and instruction (TDI) signal, which includes both the test vectors that are input to the boundary scan device and the testing instructions that are input to the instruction register 114 and performed by the TAP controller 112. Both the test vector data and the instructions are input serially to the boundary scan device 100 over the TDI signal line. Depending on the state of the inputs to the testing structures, a signal input over the TDI line will be shifted into the boundary scan input test vector register 108, or the TDI signal will be provided to the instruction register 114.

A third alternative along the TDI signal path is for the TDI signal to pass through the bypass register 116. Collections of boundary scan devices are connected in series along boundary scan lines (TCK, TMS, TDI and the output line TDO) and boundary scan test vectors intended for a boundary scan device disposed remotely from the input to the system test input point must pass through boundary scan devices to reach the remotely located boundary scan devices. Boundary scan test instructions must similarly pass through boundary scan devices to reach their target device. The bypass register 116 is a simple one-bit pass through register, which allows instructions and input test vectors to pass through the boundary scan component 100 without alteration.

Boundary scan test vectors are shifted serially into the boundary scan input register 108, and the test vector is then provided in parallel to the system logic 104. The output vector is provided in parallel from the system logic 104 to the output register 110, after which the output vector is shifted serially into the output multiplexer 118, which provides the output signals which pass through the bypass register 116 or the instruction register 114 and the output test result vector to the boundary scan device output line test data out (TDO). The TAP controller 112 is a state machine which controls the testing of the boundary scan device 100 in accordance with the instructions provided to the instruction register 114 and in accordance with the TCK and TMS signals.

The test vectors, expected test results, instructions and particular timing required for initiating and controlling boundary scan testing are generally available from the manufacturers of particular system components. In the alternative, the appropriate test vectors and protocols can be derived using commercially available boundary scan test development systems. The appropriate testing data particular to the desired target external computer system for implementing the boundary scan aspects of the present invention, should be readily available, because the testing data necessary to monitor the functions of a computer system as the system is operating is really no different from the test data used in the initial test and verification of the computer system. Accordingly, the appropriate test data necessary to implement the boundary scan aspects of the present invention should be readily available from the manufacturer of the target computer system.

Figure 7:
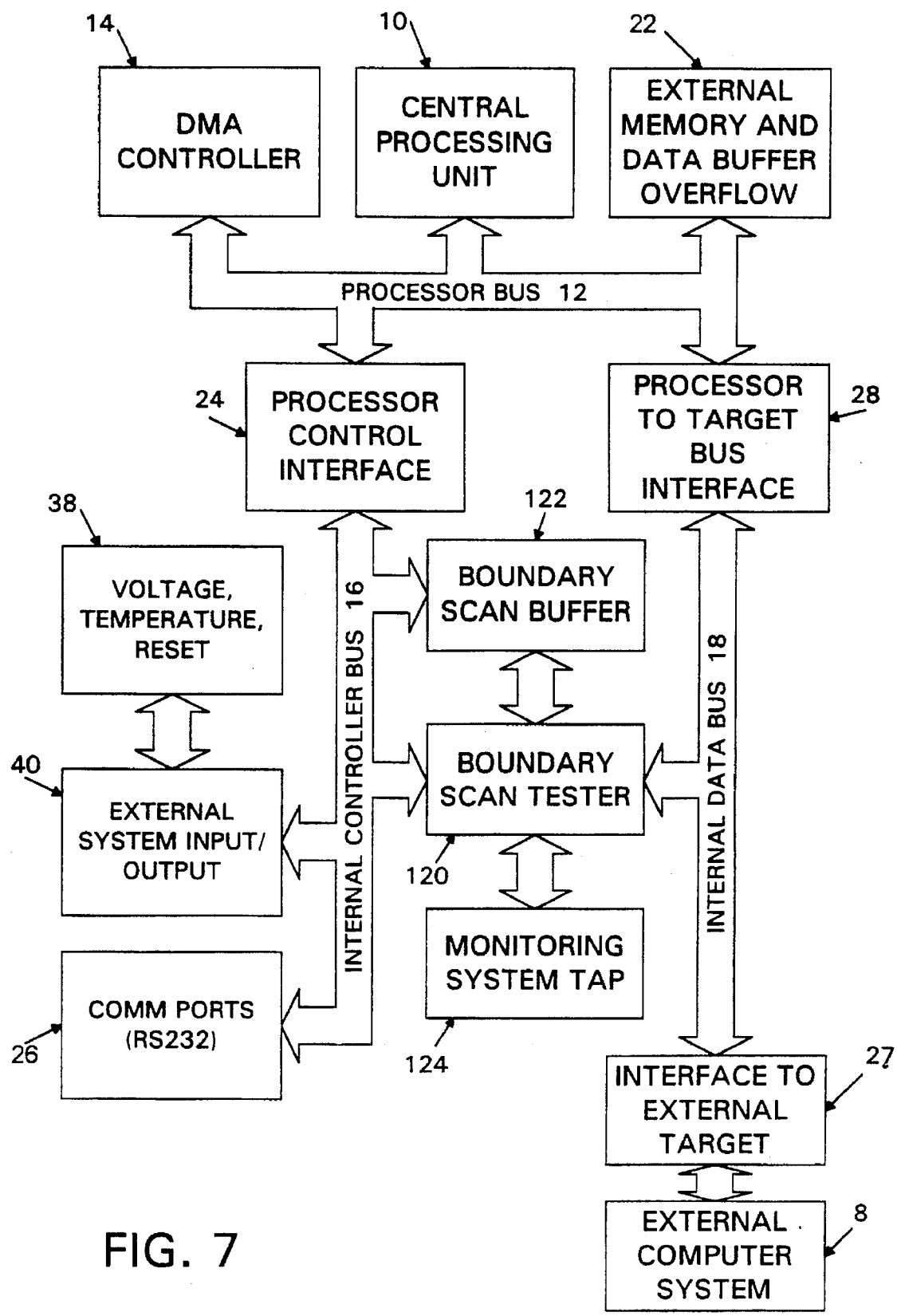
FIG. 7 is a schematic illustration of an embodiment of a boundary scan based monitoring system.

FIG. 7 illustrates an embodiment of the present invention that illustrates certain of the boundary scan aspects of the monitoring system. To facilitate understanding of the present invention, in FIG. 7, as in all of the figures used to illustrate the embodiments of the present invention, the same reference numerals are used to reference the same or similar components as have been previously described. Those components whose operation halve been previously described are not further discussed with reference to FIG. 7, except to the extent that the function or operation of these components differ from that discussed earlier.

Referring now to FIG. 7, boundary scan testing of an external computer system is controlled through the boundary scan tester 120. To initiate boundary scan testing on the external computer system 8, the boundary scan tester 120 must provide the appropriate set of test vectors, test instructions, clock timing and control signals over the internal data bus 18, through the interface to external target 27, and to the boundary scan lines (TCK, TMS, TDI and TDO) on the target bus of the external computer system 8. The tester 120 preferably receives the resulting output vectors from the external computer system 8 over the return data path and compares the test results with the expected test results to evaluate the functionality of the external computer system 8. In the alternative, the expected test results can be stored within the processor 10 and the comparisons between the test result vectors and the expected tests can be performed in the processor 10.

In a particularly preferred embodiment of the monitoring system, boundary scan test vectors are typically transferred from external memory 22 to temporary storage registers within the boundary scan buffer 122 associated with the boundary scan tester 120. In addition, the appropriate result vectors are typically transferred from the external memory to temporary storage within the boundary scan buffer 122. In the alternative, a set of commonly utilized test vectors along with the expected results can be stored in SRAM, flash memory or EEPROM within the boundary scan buffer 122. In such a configuration, it will often be necessary to recall additional sets of boundary scan test vectors from the external memory 22 so that more particularized testing can be performed to diagnose particular system errors.

The boundary scan tester 120 accesses the external system through the external target interface 27. Complete boundary scan test vectors and instructions are generated by the boundary scan tester 120, placed on the internal data bus 18 and then passed through the external target interface 27 to the external system bus. Once the test vector is in the external system, the test vector can either be read into a component of the external system for testing the system, or the test vector can pass through the system and proceed on to the particular target component for that test vector. The target of the test vector is designated through the address data within the boundary scan signals, Once the test vector is loaded into the component of the external computer system, the component acts on the test vector and produces a result signal which is then directed back to the boundary scan tester 120. The result of the target component acting on the test vector is compared with the expected result for that combination and the result of the comparison is passed to the central processing unit 10 which determines the suitable action to take upon identification of the particular result. Typically, no action would be taken if the result of the boundary scan comparison indicates the nominal result had been returned. When the boundary scan tester 120 identifies a particular error, the action taken typically depends on the type of error that is identified. For example, if a non-critical error is detected, the error may be logged along with the characteristics of the bus associated with the identified error. The error may then be analyzed in greater detail by a system analyst or further analysis can be automatically engaged a later low usage period designated for system maintenance. If, on the other hand, the error detected is a serious one, a more immediate action may be taken to preserve the data and functionality of the system. Suitable actions may include issuing an immediate alarm to a system administrator, switching to a redundant backup system, or performing an system backup to an alternate mass storage facility.

In particularly preferred embodiments of the present invention, the monitoring system further includes the circuitry necessary to initiate, control and evaluate a boundary scan test on the hardware of the monitoring system. Boundary scan testing of the monitoring system is controlled by the monitoring system TAP controller 124, which is a state machine much like the TAP controller 112 shown in FIG. 6 as a standardized component of a boundary scan test device 100. By providing a boundary scan test facility within the monitoring system, the monitoring system can perform self diagnostics to ensure that its components are functioning normally.

Preferred embodiments of a boundary scan tester in accordance with the present invention are fully programmable in that they are capable of running different sequences of tests using test vectors that may be recalled or otherwise derived from an external memory. To load boundary scan test vectors from the external memory 22 into the boundary scan buffer 122, a command signal is sent to the DMA controller 14 and the DMA controller 14 causes the external memory 22 to provide the down to the boundary scan tester. Then the boundary scan tester will initiate the boundary scan test using the retrieved boundary scan vector or, more practically, a retrieved set of boundary scan vectors. The size of practically useful boundary scan vectors is quite small so that an appropriate set of boundary scan test vectors can be retrieved quickly. In some circumstances, it may be desirable to design the monitoring system so that it selects and initiates an appropriate boundary scan test upon the detection of an error. The appropriate boundary scan test to be implemented in a particular instance will depend upon the particular error (or inconsistent bus transaction) detected, as well as the particular computer system and what transactions have recently occurred in the computer system. Accordingly, it may be necessary to develop an empirical model of the types of errors that are most likely to occur in a given system.

Knowledge of the particular failure modes of a given system can be incorporated into a data base of test strategies best suited to identifying the most common and best understood failure modes of a particular computer system. For example, if the logic analyzer determines that a possibly problematic error has occurred, but the true nature and severity of the error is unclear, it is possible to recall from external memory a set of boundary scan test vectors for testing various system components to precisely identify the nature and the source of the identified errors. Retrieved boundary scan test vectors are directed to the appropriate components of the external computer system by the boundary scan tester, with the tester directing the appropriate test vectors to the proper test nodes through the boundary scan address lines. Results from the boundary scan testing are directed back to the boundary scan tester, which compares the results with the expected results using a simple bit-wise comparison. Because of the small size of the boundary scan test vectors and the speed of the compare test, the boundary scan testing can be done with minimal interruption of the system operation. Furthermore, this error identification can likely be done sufficiently fast and sufficiently early in the system degradation process that the system can be shut down without loss of data or functionality. In the alternative, a backup system may be brought on line to keep the system in full operation or the system can be switched to a low risk mode of operation in which the possibility of irretrievable system errors can be minimized.

Frequently, a second boundary scan tester resides within the external computer system. This second boundary scan tester may be utilized by the monitoring system for certain boundary scan testing operations. If, for example, the external computer system includes a processor having the capability of initiating a boundary scan test, the processor's boundary scan tester may be accessed by the monitoring system's boundary scan tester to perform tests on the external computer system. In such a system, the monitoring system may not incorporate a complete boundary scan tester, but might include the control circuitry for utilizing the boundary scan tester within the external processor for performing boundary scan tests on the external computing system. Such a system would, however, be limited to the implementation of a boundary scan tester that is in the external computer system's processor and which is externally accessible. Because the primary function of the boundary scan tester within the external processor might not be for testing and running diagnostics on the external computer system during operation, this embodiment may be inadequate to fully monitor and diagnose the operation of the external computer system. Accordingly, unless a second, fully functional and controllable boundary scan tester is available within the external computer, it is generally preferred to incorporate a boundary scan tester within the monitoring system.

Figure 8:
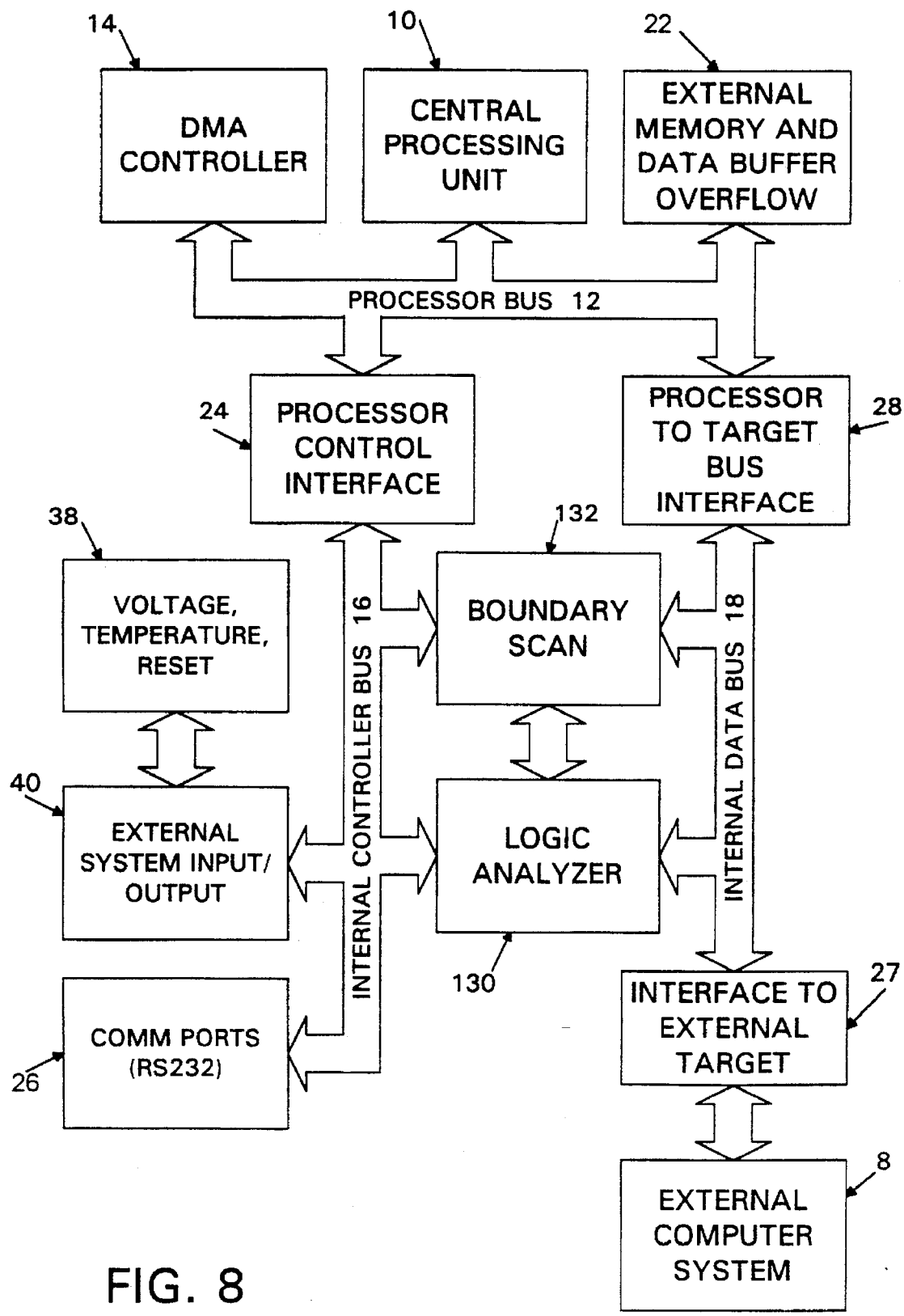
FIG. 8 is a schematic illustration of an embodiment of a monitoring system incorporating both signature analysis and boundary scan testing capabilities.

FIG. 8 illustrates a particularly preferred embodiment of the present invention. In the illustrated embodiment, both signature analysis aspects and boundary scan testing aspects of the present invention are implemented. The analyzer buffer 20 and analyzer logic controller 42 are collectively represented by the logic analyzer 130 component in FIG. 8. Similarly, the boundary scan tester 120, boundary scan buffer 122, and monitoring system TAP controller 124 are collectively illustrated by boundary scan block 132.

While the present invention has been described with reference to specific preferred embodiments thereof, it will be understood by those skilled in this art that various changes may be made without departing from the true spirit and scope of the invention. In addition, many modifications may be made to adapt the invention to a given situation without departing from its essential teachings.

What is claimed is:

1. A monitoring system comprising:

a processing unit coupled to a data bus;

an interface between the data bus and an external computer system, said interface for coupling to a bus within the external computer system to receive signals from the bus within the external computer system and to provide signals from the external computer system directly to said data bus;

a latch, connected to said data bus for receiving and storing signals from said data bus provided from said interface, wherein said latch stores said signals at a rate at which said signals are provided on the external data bus;

a writable memory for storing a plurality of at least portions of said signal stored within said latch;

a first data path coupled to said latch, wherein said signals from the latch pass along said first data path to said writable memory;

a second data path coupled to said latch;

a trigger circuit to receive said signals provided to the interface from the external computer system along said second data path wherein said trigger circuit generates a trigger signal on the basis of a comparison between a one of said signals from said latch and a predetermined mask pattern representing a state of a bus that is diagnostic between normal, error-free operation and abnormal, incorrect operation of the external computer system, wherein said trigger signal identifies a target transaction on the bus of the external computer system; and a filter circuit connected to said first data path and to said writable memory, said instructions from the latch passing through said filter circuit before being provided to said writable memory, wherein said filter circuit causes some of said signals from said latch to not be stored in said writable memory.

2. The monitoring system of claim 1 wherein said signals provided to said filter circuit comprise data words having a first number of data bits corresponding to a number of data bits carried in parallel on the bus in the external computer system and wherein said filter circuit causes a portion of each data word to not be stored in said writable memory.

3. The monitoring system of claim 1 wherein said trigger circuit generates said trigger signal so as to define a target time within said external computer system at which said target transaction occurred and wherein a data block stored within said writable memory includes data present on the bus of the external computer system at said target time, said data block including data present on the bus of the external computer system at a time prior to said target time and data present on the bus of the external computer system a time after said target time.

4. The monitoring system of claim 3 wherein said trigger circuit generates a tag characteristic of said one of said received signals, wherein said tag is appended to said data block.

5. A monitoring system according to claim 1, further comprising:

a second memory coupled to said writable memory through a control bus; and a memory controller coupled to said writable memory and to said second memory, wherein said memory controller causes said writable memory to transfer a data block to said second memory upon receipt by said memory controller of said trigger signal generated by said trigger circuit.

6. The monitoring system of claim 5 wherein said second memory is disposed within said processing unit.

7. A monitoring system comprising:

a processing unit coupled to a data bus;

an interface between the data bus and an external computer system, said interface for coupling to a bus within the external computer system to receive signals from the bus within the external computer system and to provide signals from the external computer system directly to said data bus;

a latch connected to said data bus for receiving and storing signals from said data bus provided from said interface, wherein said latch stores said signals at a rate at which said signals are provided on the external data bus;

a writable memory for storing a plurality of at least portions of said signals stored within said latch;

a first data path coupled to said latch, wherein said signals from the latch pass along said first data path to said writable memory;

a second data path coupled to said latch;

a trigger circuit to receive said signals provided to the interface from the external computer system along said second data path, wherein said trigger circuit generates a trigger signal on the basis of a comparison between a one of said signals from said latch and a predetermined mask pattern representing a state of a bus that is diagnostic between normal, error-free operation and abnormal, incorrect operation of the external computer system, wherein said trigger signal identifies a target transaction on the bus of the external computer system;

a second memory coupled to said writable memory through a control bus; and a memory controller coupled to said writable memory and to said second memory, wherein said memory controller causes said writable memory to transfer a data block to said second memory upon receipt by said memory controller of said trigger signal generated by said trigger circuit.

8. The monitoring system of claim 7 wherein said second memory is disposed within said processing unit.

9. The monitoring system of claim 7 wherein said trigger circuit generates said trigger signal so as to define a target time within said external computer system at which said target transaction occurred and wherein a data block stored within said writable memory includes data present on the bus of the external computer system at said target time, said data block including data present on the bus of the external computer system at a time prior to said target time and data present on the bus of the external computer system a time after said target time.

10. The monitoring system of claim 9 wherein said trigger circuit generates a tag characteristic of said one of said received signals, wherein said tag is appended to said data block.

* * * * *